United States Patent
Darbandi et al.

(10) Patent No.: US 12,555,843 B2
(45) Date of Patent: Feb. 17, 2026

(54) ENERGY STORAGE DEVICE, MOTOR VEHICLE AND COOLING PLATE ASSEMBLY

(71) Applicant: Bayerische Motoren Werke Aktiengesellschaft, Munich (DE)

(72) Inventors: Azad Darbandi, Unterfoehring (DE); Tobias Schmieg, Niederstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 644 days.

(21) Appl. No.: 17/917,602

(22) PCT Filed: Mar. 2, 2021

(86) PCT No.: PCT/EP2021/055161
§ 371 (c)(1),
(2) Date: Oct. 7, 2022

(87) PCT Pub. No.: WO2021/209187
PCT Pub. Date: Oct. 21, 2021

(65) Prior Publication Data
US 2023/0147569 A1     May 11, 2023

(30) Foreign Application Priority Data

Apr. 17, 2020   (DE) ............... 10 2020 110 543.6

(51) Int. Cl.
*H01M 10/6555*   (2014.01)
*H01M 10/613*   (2014.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
CPC ............. H01M 10/613; H01M 10/625; H01M 10/643; H01M 10/6554; H01M 10/6555;
(Continued)

(56) References Cited

U.S. PATENT DOCUMENTS

| 2004/0069620 A1 | 4/2004 | Bitsche et al. |
| 2011/0159340 A1 | 6/2011 | Hu et al. |

(Continued)

FOREIGN PATENT DOCUMENTS

| DE | 100 34 134 A1 | 1/2002 |
| DE | 10 2011 103 984 A1 | 12/2012 |

(Continued)

OTHER PUBLICATIONS

International Search Report (PCT/ISA/210) issued in PCT Application No. PCT/EP2021/055161 dated Jun. 28, 2021 with English translation (four (4) pages).

(Continued)

*Primary Examiner* — Lingwen R Zeng
(74) *Attorney, Agent, or Firm* — Crowell & Moring LLP

(57) ABSTRACT

An energy storage device having a plurality of cells for storing electrical energy, and a plurality of cooling plates, which are arranged between the cells, wherein insulation sides of the cooling plates are thermally insulated to inhibit thermal propagation. Also disclosed are a motor vehicle having such an energy storage device and a cooling plate assembly.

15 Claims, 5 Drawing Sheets

(51) Int. Cl.
*H01M 10/625* (2014.01)
*H01M 10/6568* (2014.01)
*H01M 10/658* (2014.01)
*H01M 10/643* (2014.01)
*H01M 10/6554* (2014.01)
*H01M 10/6557* (2014.01)
*H01M 50/213* (2021.01)
*H01M 50/249* (2021.01)

(52) U.S. Cl.
CPC ..... *H01M 10/6568* (2015.04); *H01M 10/658* (2015.04); *H01M 10/643* (2015.04); *H01M 10/6554* (2015.04); *H01M 10/6557* (2015.04); *H01M 50/213* (2021.01); *H01M 50/249* (2021.01); *H01M 2220/20* (2013.01); *Y02E 60/10* (2013.01)

(58) Field of Classification Search
CPC ......... H01M 10/6557; H01M 10/6568; H01M 10/658; H01M 2220/20; H01M 50/213; H01M 50/249; Y02E 60/10
See application file for complete search history.

(56) References Cited

U.S. PATENT DOCUMENTS

| | | | |
|---|---|---|---|
| 2018/0166757 A1* | 6/2018 | Smoot | H01M 10/6552 |
| 2018/0291076 A1 | 10/2018 | Kjeldsen et al. | |
| 2020/0358152 A1* | 11/2020 | Shimizu | H01M 50/209 |

FOREIGN PATENT DOCUMENTS

| | | |
|---|---|---|
| GB | 2561211 A | 10/2018 |
| JP | 2021-119156 A | 8/2021 |
| WO | WO 2014/103770 A1 | 7/2014 |
| WO | WO 2018/206894 A1 | 11/2018 |
| WO | WO 2019/146438 A1 | 8/2019 |
| WO | WO 2020/054228 A1 | 3/2020 |

OTHER PUBLICATIONS

German-language Written Opinion (PCT/ISA/237) issued in PCT Application No. PCT/EP2021/055161 dated Jun. 28, 2021 (eight (8) pages).
German-language Search Report issued in German Application No. 10 2020 110 543.6 dated Dec. 7, 2020 with partial English translation (10 pages).

* cited by examiner

ENERGY STORAGE DEVICE, MOTOR VEHICLE AND COOLING PLATE ASSEMBLY

BACKGROUND AND SUMMARY

The technology disclosed here relates to an energy storage device, and to a motor vehicle having such an energy storage device, and to a cooling plate assembly.

An energy storage device typically has a plurality of cells for storing electrical energy, for example in a motor vehicle. Such cells can, for example, be of elongate design and can allow the use of installation spaces that are not accessible for large-volume energy storage devices with predefined external dimensions.

Energy storage devices comprising such cells can be cooled by cooling plates, for example. These can run between the cells and contact them, thus allowing heat to dissipate. However, they may also reduce resistance to malfunctions.

It is a preferred object of the technology disclosed here to reduce or eliminate at least one disadvantage of a previously known solution or to propose an alternative solution. In particular, it is a preferred object of the technology disclosed here to propose an energy storage device which, in the event of malfunctions such as short circuits of individual cells, can better limit the effects of such malfunctions. Further preferred objects may become evident on the basis of the advantageous effects of the technology disclosed herein. The objects are achieved by the subject matter of the independent claims. The dependent claims represent preferred embodiments.

The technology disclosed here relates to an energy storage device comprising (i) a plurality of cells for storing electrical energy, and (ii) a plurality of cooling plates arranged between the cells, wherein one or more cooling plates each have a cooling side and an insulation side and contact one or some of the cells with the cooling side and/or the insulation side, wherein the cooling sides have a higher thermal conductivity than the insulation sides. This ensures that the cooling plates can still perform their cooling function with respect to the cells, but, due to their insulation sides, can reduce or prevent heat propagation between the cells. If, for example, one of the cells should become low-resistance or short-circuited, which can typically lead to strong heating (also referred to as "thermal runaway"), other cells contacted via the cooling plate are thus prevented from also being heated.

In particular, each of the cooling plates used can have a cooling side and an opposite insulation side. This may also apply to some of the cooling plates. A cooling side is typically configured to ensure good thermal contact with adjacent cells. An insulation side is typically thermally insulated and provides poorer thermal contact. Typically, cooling plates do not contact the cells by any side other than the cooling sides and the insulation sides.

A cooling plate can in particular be a flat element, which does not have to be planar, however, but can in particular be undulating. A cooling plate typically serves to dissipate thermal energy. For this purpose, a thermal conductivity of the cooling plate itself can be used, and channels for passing through a cooling fluid can be formed in the cooling plate, for example. This makes it possible, for example, to connect to a cooling system of a motor vehicle. Contacting of the cells is meant here in particular in the sense of a mechanical contacting, that is to say in particular independently of an electrical contacting. The contacting between a cooling plate and a cell can extend in particular over a certain area.

An arrangement of the cooling plates between the cells can mean in particular that cooling plates are surrounded by cells in a specific installation space. This does not rule out the possibility that cells and cooling plates can also be arranged at the edges. The contacting of the cells by the cooling plates leads in particular to the fact that cooling plates and cells can be densely packed. Cells contacted by a cooling plate can in particular be directly adjacent to the cooling plate.

An insulation side can be designed in particular specifically to prevent or reduce heat propagation via the insulation side, that is to say in particular between the cooling plate and an adjacent element. For this purpose, measures such as the use of a thermally insulating material, for example a thermally insulating layer, and/or a use of a foil or other layer to create a distance may be provided. Insulation is to be understood herein in particular as thermal insulation.

By contrast, a cooling side can be designed in particular for good heat propagation via the cooling side.

Thermal insulation can extend in particular over an entire side, for example an upper side or lower side of a cooling plate. The sides, that is to say the cooling side and the insulation side, are typically opposite each other or point in different directions. The cooling side and the insulation side are typically larger, in particular significantly larger, than side faces or end faces of the cooling plates.

An insulation side can be designed in particular to prevent or at least significantly reduce heat propagation or heat transport over the side. Heat exchange between the cooling plate and an adjacent element is thus prevented or reduced, in particular significantly reduced, at the insulation side, for example compared to a non-thermally insulated side or the cooling side. In particular, the cooling sides may have at least five, ten or twenty times the thermal conductivity of the insulation sides. In particular, this may apply to a comparison of each cooling side with each insulation side, or only to a subset of the sides.

In particular, the cells can be electrochemical energy storage cells.

In particular, the technology disclosed herein can increase the resistance to a thermal fault. Such a thermal fault is routinely a fault in which an exothermic chemical reaction occurs. Such a fault can also be a thermal runaway event. In particular, the fault can be an event that causes a non-operational and self-intensifying heat production in the individual cells. Propagation could possibly start in this case. Such a fault can be caused, for example, by an internal short circuit in an individual cell or by a fire source.

The energy storage device is in particular a device for storing electrical energy, in particular to drive at least one electrical (traction) drive machine. The energy storage device typically has a plurality of cells. For example, the energy storage device can be a high-voltage storage device or a high-voltage battery. In particular, it can be surrounded by a storage housing, which is expediently an enclosure that surrounds at least the high-voltage components of the energy storage device.

The cells can be designed in particular as round cells for the electrochemical storage of energy. A round cell is usually housed in a cylindrical cell housing (cell "can"). If, for example, the active materials of the round cell expand due to operation, the housing is subjected to tensile stress in the peripheral region. Advantageously, comparatively thin housing cross sections can thus compensate for the forces resulting from swelling. Preferably, the cell housing is made of steel or a steel alloy or of aluminum.

Expediently, the aforementioned storage housing can be designed to be gas-tight so that any gases escaping from the cells are trapped. Advantageously, the storage housing may provide fire protection, contact protection, intrusion protection and/or protection against moisture and dust. The storage housing can be made at least partially of a metal, in particular aluminum, an aluminum alloy, steel, or a steel alloy. At least one or more of the following components can be accommodated in the at least one storage housing of the energy storage device: storage cells or cells, component parts of the power electronics, contactor(s) for interrupting the power supply to the motor vehicle, cooling elements, electrical conductors, control unit(s). In particular, the energy storage device can comprise elements to be cooled, in particular cells and/or component parts of the power electronics of the energy storage device. Expediently, the components are preassembled before the assembled module is installed in the motor vehicle.

In particular, the cells can have at least one degassing opening at each of two ends. The degassing openings serve in particular to allow gases to escape from the cell housing. However, only one degassing opening per round cell or cell may be provided. Advantageously, at least one degassing opening per cell is arranged to degas towards the outer sill in the installation position.

Preferably, the length-to-diameter ratio of the cells or round cells has a value between 5 and 30, preferably between 7 and 15, and particularly preferably between 9 and 11. The length-to-diameter ratio is the quotient of the length of the cell housing of the round cell in the numerator and the diameter of the cell housing of the round cell in the denominator. In a preferred embodiment, the round cells may, for example, have an (outer) diameter of about 45 mm to 55 mm. Further advantageously, the round cells may have a length of from 360 mm to 1,100 mm, preferably from about 450 mm to 600 mm, and particularly preferably from about 520 mm to 570 mm.

In particular, the cells can be made from coated semi-finished electrode products. It is expedient that the cathode material or the anode material is applied to carrier layers or carrier layer webs of the particular semi-finished electrode product. For example, the cathode material can be applied to a cathode support layer (for example aluminum) and the anode material can be applied to an anode support layer (for example copper) by coating.

In particular, it can also be provided that the cells comprise at least one coated electrode semi-finished product that does not have a mechanical separation edge perpendicular and/or parallel to the longitudinal axis of the round cells, which was created by a separation process step after the coating of the electrode semi-finished products. It may also be provided that the cells each comprise at least one coated semi-finished electrode product having a rectangular cross-section, wherein the length of the longer side of the semi-finished electrode product substantially equals or exceeds a total width of a substrate web that has been coated with anode material or cathode material to form the semi-finished electrode product, such that the semi-finished electrode product is or was windable in the longitudinal direction of the substrate web after coating without a further separation process step.

In particular, a cell can be produced by means of a method comprising the step of winding the electrode semi-finished product into a storage cell after coating at least one support layer web forming the electrode semi-finished product with cathode material or anode material, without subjecting the support layer web to a further separation process step in the longitudinal direction of the support layer web after the coating.

In particular, the cells, in their installed position, can run substantially parallel (that is to say parallel, possibly with deviations that are insignificant for the function) to the vehicle transverse axis Y. In this context, the vehicle transverse axis is that axis which, in the normal position of the motor vehicle, is perpendicular to the vehicle longitudinal axis X and horizontal. However, the cells can also run parallel to the longitudinal axis X of the vehicle, for example.

In particular, the cells can be arranged in a plurality of layers in the direction of the vehicle vertical axis Z. The vehicle vertical axis Z is that axis which is perpendicular to the vehicle longitudinal axis X and vertical in the normal position of the motor vehicle. In this context, a layer of cells is in particular a plurality of cells which are installed in the same plane in the storage housing or also in some other way and have substantially the same distance from the ground. The number of layers can vary in the direction of the longitudinal axis X of the vehicle. This allows for better utilization of the installation space.

In particular, the cooling plates can be arranged in one layer or a plurality of layers, wherein each layer comprises a plurality of cooling plates. For example, a single layer of cooling plates can be used when only two layers of cells are present, wherein, for example, one layer of cells can then be arranged above the layer of cooling plates and one layer of cells can be arranged below the layer of cooling plates. If more than two layers of cells are present, multiple layers of cooling plates are also typically used, wherein a layer of cooling plates is typically located between each two layers of cells directly above each other.

A layer of cooling plates typically comprises a plurality of cooling plates installed in the same plane in the storage housing or otherwise and spaced substantially at the same distance from the bottom.

In particular, at least one of the layers or each layer can comprise cooling plates having their insulation side pointing in a first common direction and cooling plates having their insulation side pointing in a second common direction, which is opposite the first common direction. The respective other sides are typically not thermally insulated or formed as cooling sides. Thus, by means of one layer of cooling plates, both the layer of cells above and the layer of cells below can be cooled. In particular, cooling plates having their insulation side pointing in the first common direction and cooling plates having their insulation side pointing in the second common direction can be alternately arranged within at least one of the layers or each layer. This means in particular that, in a direction through the plane in which the cooling plates of the layer are arranged, cooling plates always alternate directly with respect to the direction in which their insulation side points. This ensures a uniform cooling effect upwards and downwards.

According to one embodiment, at least one of the layers or each layer of cooling plates comprises only cooling plates having their insulation sides pointing in a common direction. Accordingly, typically the other side of these cooling plates, that is to say the cooling side, points in an opposite, common direction. In this way, layers of cooling plates can be formed which cool in only one direction.

A direction is not to be understood here in the strict sense, but can also be only a rough direction, for example if a cooling plate is undulating, as already mentioned, and thus surface normals are inevitably not parallel.

According to one possible embodiment, which can also be combined with other embodiments described here, it can be provided that cooling plates of two layers of cooling plates contact cells of a layer of cells arranged directly between the layers of cooling plates in each case by an insulation side. In this way, the cells of the aforementioned layer are contacted exclusively by insulation sides. This can take into account the fact that the cells of such a layer are contacted by cooling plates of two layers of cooling plates and would thus be cooled more strongly than cells contacted only by cooling plates of one layer of cooling plates, all other things being equal. There is also typically a certain heat flow, that is to say, cooling power, through the insulation sides. In the aforementioned layer of cells, the cells in the embodiment just described are contacted by more cooling plates than other layers, but in each case by the insulation side of the cooling plates. Thus, excessive cooling is avoided or, in other words, the higher number of contacting cooling plates is compensated by the use of the insulation sides.

According to one embodiment, each cell is contacted by at least one cooling side. This ensures that each cell can be cooled by at least one cooling plate. Accordingly, it can also be provided that a plurality of cooling sides of a plurality of cooling plates of one layer are provided, which contact each adjacent cell. This can improve the cooling performance.

Preferably, a cooling side and an insulation side of the cooling plate are formed between two cells that are adjacent, directly opposite each other, to a cooling plate. This ensures that, specifically, heat propagation between such directly opposite cells is effectively prevented, since one of the sides is an insulation side. In particular, this can refer to all cells of the energy storage device arranged in this way. Since the cooling plates are typically designed to conduct heat very well, there is an increased risk, particularly in the case of such cells, that overheating will spread between such cells and thus a single cell with a heat event will also affect the immediately opposite cell. This is effectively prevented by the embodiment described here. Cells adjacent, directly oppositely, to a cooling plate are in particular those which rest against a point along a longitudinal extent of the cooling plate only on different sides, that is to say upper side and lower side, for example.

The cells can be cylindrical in particular. In particular, they can be round cells. These can be produced particularly easily and can be arranged in a particularly dense and space-saving manner.

In particular, longitudinal axes of the cells can be oriented parallel to each other. This allows a simple and good utilization of typical installation spaces, for example in an underfloor region of a motor vehicle.

Spaces between the cells can in particular be filled with thermally insulating material and/or with fire-retardant material. In particular, the material may also be material that is both thermally insulating and fire retardant. For example, aerogel, fiberglass or silicone foam can be used. This can prevent heat propagation between immediately adjacent cells between which there is no cooling plate, that is to say which are in the same layer of cells, for example. The thermally insulating and/or fire-retardant material can also be located between cooling plates. It can completely or partially fill the gaps or an intermediate space.

In particular, the cooling plates can be undulating and/or complementary to the cells at contact regions to the cells. In this way, particularly good contacting of the cells can be achieved, for example when round cells are used. This improves heat transfer. A complementary design of a cooling plate is characterized in particular by the fact that the cell and the cooling plate are in contact with each other along a segment of their surfaces. An undulating form can in particular be implemented in a plane transverse to longitudinal extents or longitudinal axes of the cells and/or transverse to a vehicle transverse axis Y or vehicle longitudinal axis X. Similarly to the complementary design, this can relate to a cross section of the cooling plate. The cooling sides and insulation sides of the cooling plates can in particular be smooth, that is to say in particular have no further structuring other than the undulating form or the design complementary to the cells, but they can also be structured.

The insulation sides can in particular be thermally insulated by means of a thermally insulating layer. This allows a simple design of the thermal insulation, wherein after or during the manufacture of a cooling plate it can be determined which of its sides is to be thermally insulated, for example by applying the corresponding layer. For example, a layer can be applied here as a coating, wherein a side to be coated is typically covered with shapeless material that is to form the layer. Likewise, it is possible to use a film to form a layer, which can be glued on, for example.

The thermally insulating layer can be formed in particular of a mineral material, zeolite, glass fiber and/or silicone. Such materials have proven themselves for typical thermally insulating layers. In particular, a thermally insulating layer can have a thickness of at most 1 mm. This is sufficient for typical applications. The thickness can also be between 0.5 mm and 1.5 mm, for example.

In an energy storage device, regions with different numbers of layers of cells can also be combined. This allows the energy storage device to adapt to different heights in an installation space. For example, the energy storage device can be arranged in an installation space under a passenger compartment. For example, it can have only one or two layers under a footwell and three or more layers under a seat area. A layer of cooling plates is typically arranged between each two layers of cells directly above each other.

The technology disclosed here further relates to a motor vehicle having an energy storage device as described herein. With respect to the energy storage device, any of the described variants may be used. In particular, the energy storage device can be arranged under a passenger compartment of the motor vehicle.

The technology disclosed here further relates to a cooling plate assembly having a layer of cooling plates, wherein each cooling plate has a cooling side and an insulation side. The insulation sides of the cooling plates can in particular point alternately in different, in particular opposite directions, or they can also point in the same direction. The cooling plate assembly can have one or more connection elements for passing cooling liquid through the cooling plates. With respect to the stated elements of a cooling plate assembly, for example the design of the cooling plates, reference is made to the description provided elsewhere herein. A cooling plate assembly can be used, in particular, in an energy storage device.

In other words, the phenomenon of "thermal propagation" refers, for example, to the rapid spread of heat generated, for example, in the case of an internal cell defect or conductive particle. It has been recognized that a significant part of the heat transfer takes place via cooling plates, as these are typically designed for a good thermal connection of the individual cells.

Thermal spread between cells can be well controlled, for example, by using thermal barriers (for example, aerogel, fiberglass, silicone foam, etc.). However, good thermal bonding of the cells to the cooling plates, for example by thermopaste, can lead to superimposed cells that share the same cooler seeing faster heat transport and thus experiencing thermal runaway.

To counteract this, cooling channels of a multi-port cooler, for example, can be thermally insulated against the cells alternately on the upper side and lower side. This still ensures a sufficiently good thermal connection to the cooler to represent fast charging and high performance. On the other hand, however, the good thermal connection of superimposed cells is reduced to such an extent that the thermal runaway of these cells can be avoided.

The technology disclosed here will now be described with reference to the figures.

DETAILED DESCRIPTION

Figure 1:
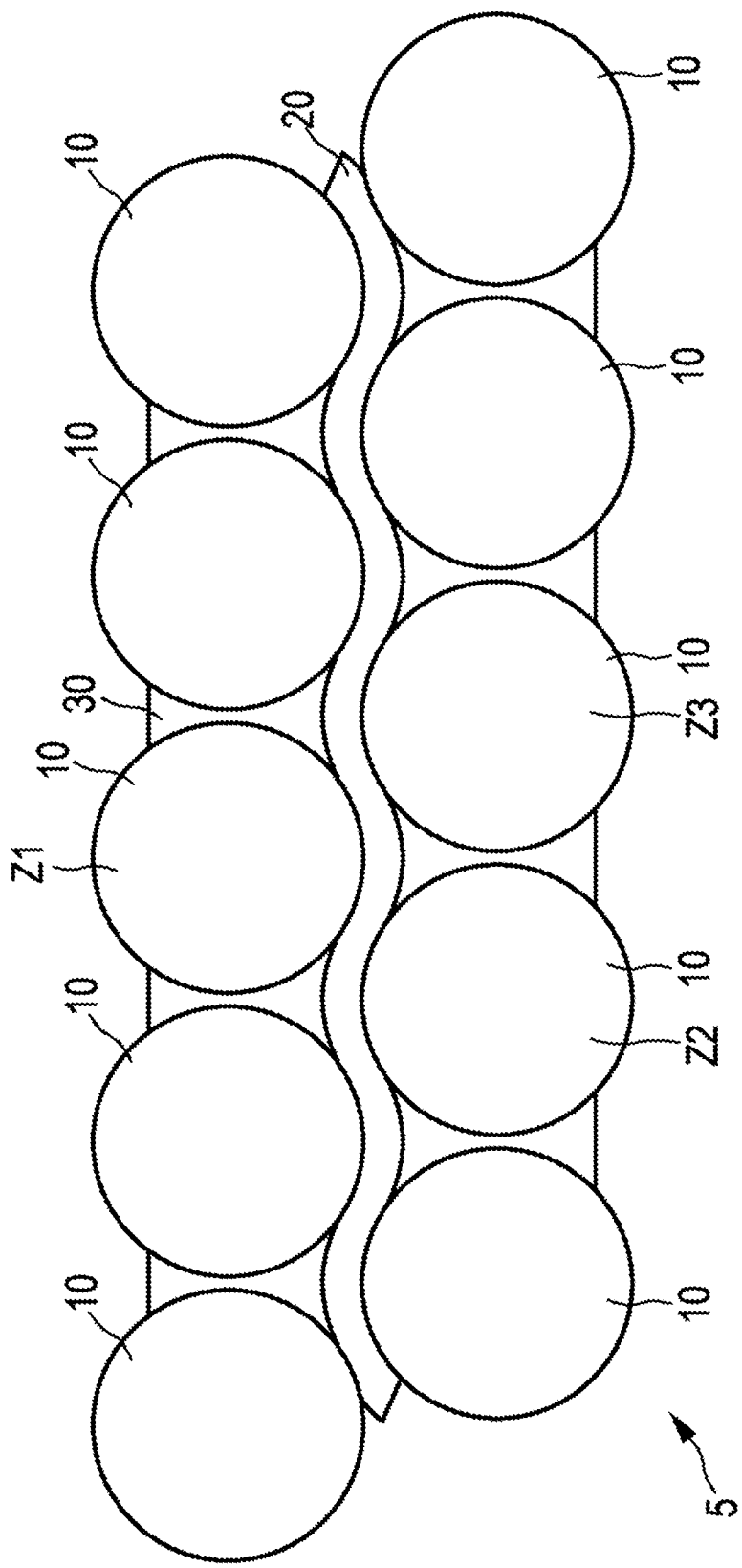
FIG. 1: shows an energy storage device according to the prior art.

FIG. 1 shows an energy storage device 5 according to the prior art. This is a purely schematic lateral cross-sectional view.

The energy storage device 5 has a plurality of cells 10 for storing electrical energy. As shown, these are embodied as round cells, the longitudinal axes of which extend transversely to the paper plane of FIG. 1, and are arranged in two layers directly above one another.

A cooling plate 20 is arranged between the two layers of cells 10. As shown, this cooling plate is of undulating design and contacts the cells 10. This allows heat which is generated in the cells 10 during charging or current draw to be dissipated.

Thermally insulating material 30 is inserted between the cells 10 so that there is sufficient thermal insulation between cells 10 of a layer. Thus, should one of these cells become low-resistance, for example, or exhibit excessive heat generation for some other reason, propagation of such a thermal event in the same layer is effectively prevented by the thermally insulating material 30.

A possible thermal propagation via the cooling plate 20 is explained below on the basis of three of the cells 10, which are denoted Z1, Z2, Z3. If, for example, a thermal event occurs in cell Z1 which leads to overheating, the two cells Z2 and Z3 directly below, which rest against the cooling plate 20 directly opposite cell Z1, can be affected by this thermal event due to the good thermal conductivity of the cooling plate. In particular, a temperature increase can easily spread across the cooling plate 20 from cell Z1 to cells Z2 and Z3. This represents a disadvantage in the known prior art.

Figure 2:
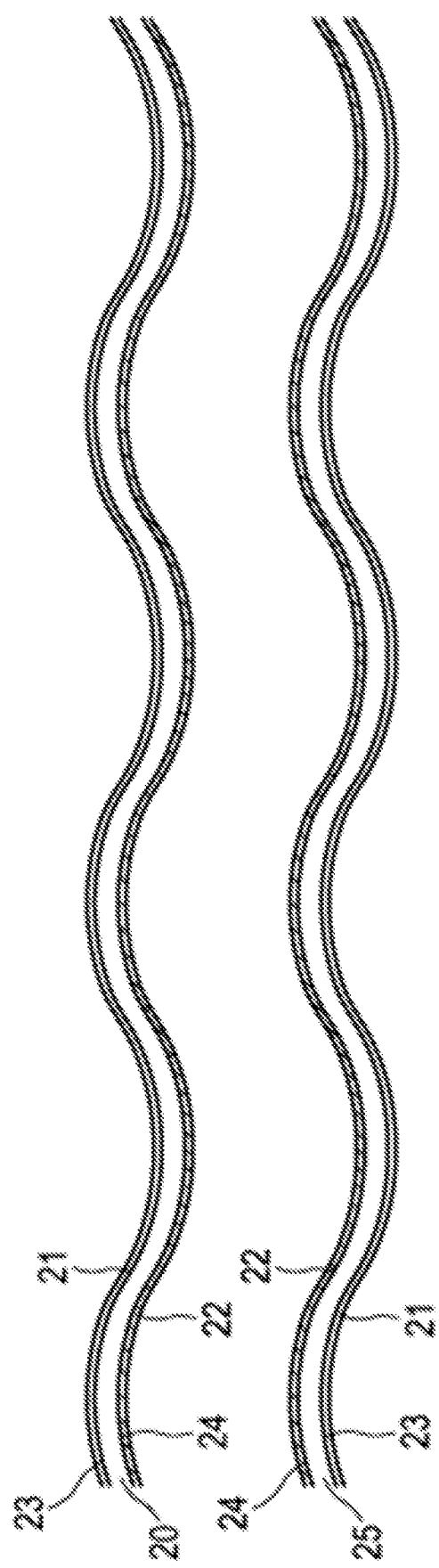
FIG. 2: shows two designs of cooling plates.

To avoid this, cooling plates can be used as shown schematically in cross-section in FIG. 2. A cooling plate 20 of a first type and a cooling plate 25 of a second type are shown there. The cooling plate 20 of the first type has a thermally conductive layer 21 on its upper side, making the upper side a cooling side 23. On its lower side, it has a thermally insulating layer 22, shown hatched, making the lower side an insulation side 24. In the case of the cooling plate 25 of the second type, it is the other way round, that is to say on its upper side it has a thermally insulating layer 22, whereby the upper side becomes an insulation side 24, whereas on its lower side it has a thermally conductive layer 21, whereby the lower side becomes a cooling side 23. In this case, the upper side points upwards and the bottom side points downwards, as shown, which applies to both cooling plates 20, 25, wherein it should be noted that although this can be a condition as in the installation situation, a different installation situation can also be selected, that is to say the sides can also be oriented differently.

A thermally conductive layer 21 can be formed from thermopaste, for example. Alternatively, however, such a layer could also be dispensed with and heat conduction could be effected solely by contacting an element to be cooled via the cooling plate 20, 25. A thermally insulating layer 22 can be formed, for example, of zeolite, glass fiber and/or silicone. In principle, a thermally insulating layer 22 can also be thicker than the thermally conductive layer 21.

Figure 3:
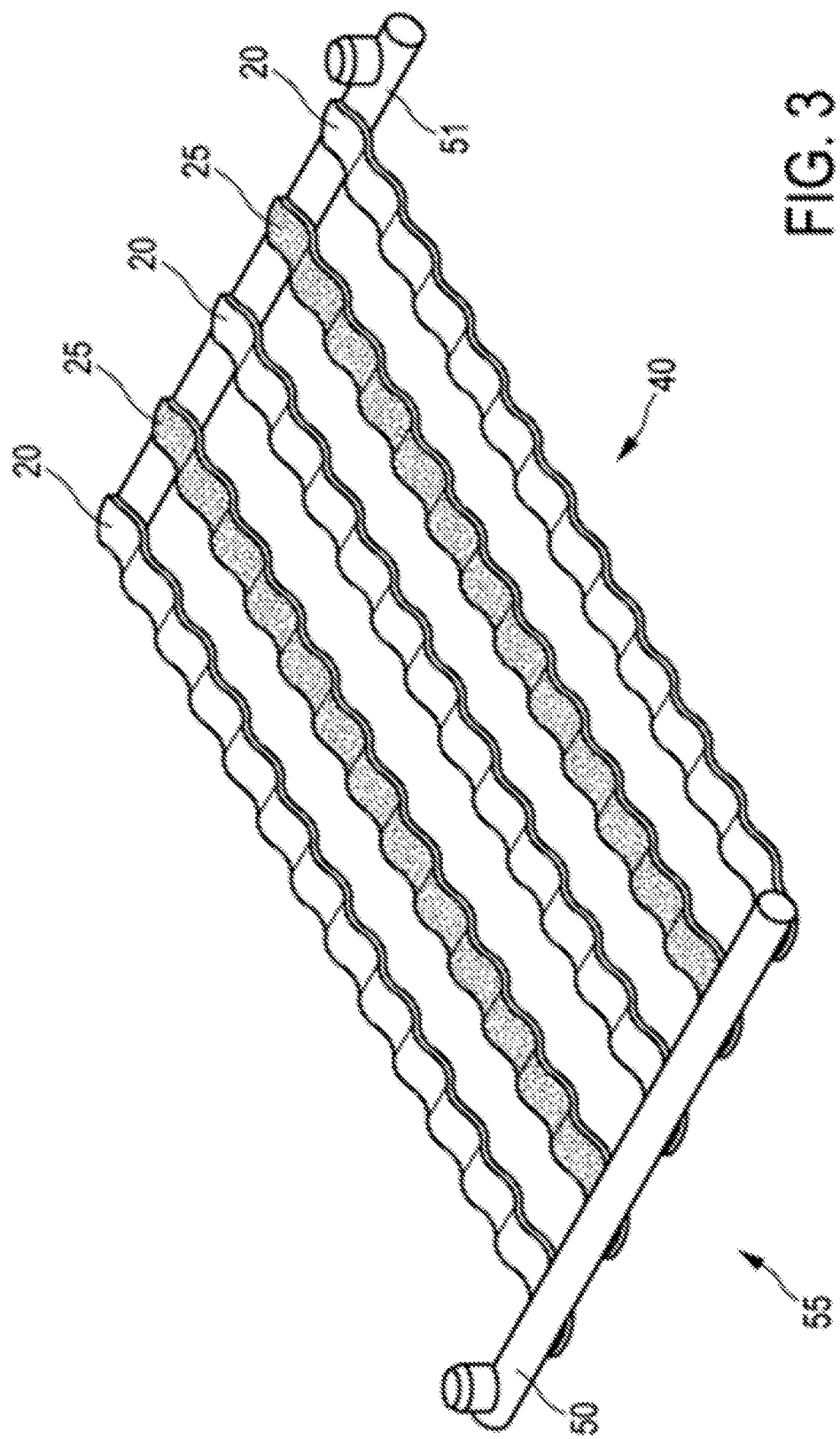
FIG. 3: shows a plurality of cooling plates with connection elements.

FIG. 3 shows a layer 40 of cooling plates 20, 25. Here, cooling plates 20 of the first type alternate with cooling plates 25 of the second type, as shown. They are thus arranged alternately. Thus, there is always a cooling plate 20 of the first type with a thermally conductive layer 21 pointing upwards, and immediately next to it there is a cooling plate 25 of the second type with a thermally insulating layer 22 pointing upwards. On the lower side, the situation is the reverse, correspondingly. For simplicity, the layers 21, 22 are not denoted in FIG. 3; reference should be made to FIG. 2 in this regard. However, the cooling plates 25 of the second type are dotted on the top side to show their thermal insulation on this side.

The cooling plates 20, 25 are connected to lateral connection elements 50, 51. These serve to guide a cooling fluid through channels formed in the cooling plates 20, 25. They can, for example, be connected to a cooling circuit of a motor vehicle. In this way, particularly effective heat dissipation can be achieved.

In the embodiment shown in FIG. 3, the cooling plates 20, 25 form a cooling plate assembly 55. The connection elements 51, 52 can also be understood as part of this cooling plate assembly 55.

Figure 4:
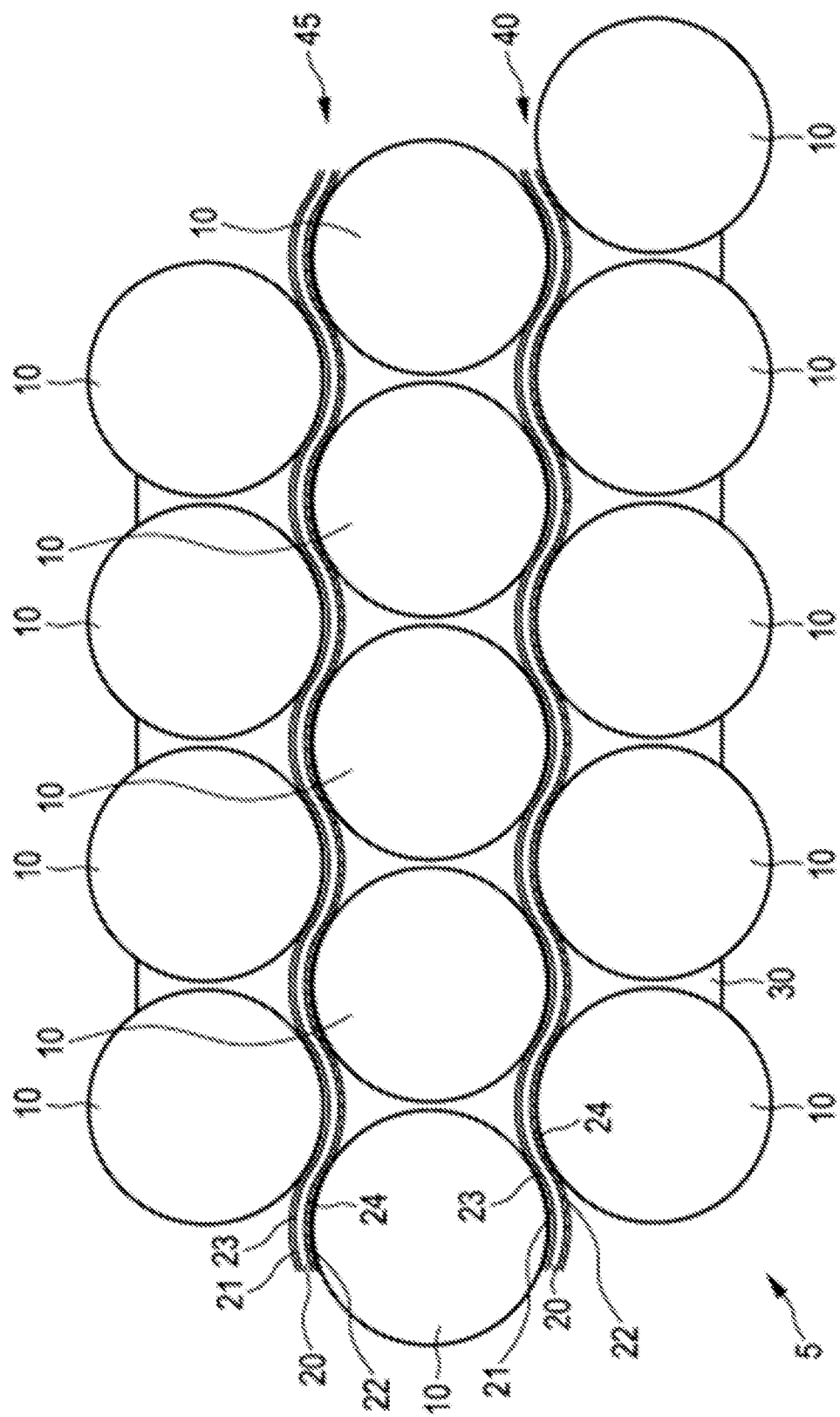
FIG. 4: shows an energy storage device according to a first exemplary embodiment.

FIG. 4 shows an energy storage device 5 according to a first exemplary embodiment. The components described with reference to FIGS. 2 and 3 are used here.

In the embodiment shown, there are three layers of cells 10. These are likewise embodied as round cells, wherein the aforementioned thermally insulating material 30 is located between the cells 10.

A cooling plate 20 is arranged between the bottom layer and the middle layer and between the middle layer and the top layer of cells 10, respectively. These cooling plates belong to a layer 40 of cooling plates and to another layer 45 of cooling plates, respectively. This cooling plate is of the first type, moreover in both cases. This refers to the section shown here. Thus, in each case the upper side is covered with a thermally conductive layer 21 and the lower side is covered with a thermally insulating layer 22. Thus, each cooling plate 20 cools the cells 10 located above it, since a cooling side 23 points upwards in each case. The cells 10 below, on the other hand, are not cooled at all or only to a much lesser extent by this cooling plate 20 of the first type, since the thermally insulating layer 22 is used here, that is to say the lower side is an insulation side 24.

It should be noted that this does not mean that the cells 10 of the bottom layer are not cooled. Rather, FIG. 4 is a sectional view indicating the condition along a section. If the section were shifted in a direction transverse to the paper plane of FIG. 4, it would pass through a cooling plate 25 of the second type, since these are arranged alternately as described with reference to FIG. 3. Thus, all cells 10 shown are cooled.

The design of the cooling plates 20, 25 with the thermally insulating layers 22 advantageously ensures that the thermal propagation described with reference to FIG. 1 cannot take place from an overheating cell 10 to directly opposite cells 10. Such possible thermal propagation is stopped at the thermally insulating layer 22. Thus, if one of the cells 10 shown in FIG. 4 were to overheat, other cells 10 of the same layer would be protected by the thermally insulating material 30 between the cells 10, and cells of other layers would be protected by the thermally insulating layer 22 on the corresponding cooling plate 20, 25.

As an alternative to the embodiment of FIG. 4, cooling plates 25 of the second type could also be used exclusively in the layer 40 of cooling plates, and cooling plates 20 of the first type could be used exclusively in the further layer 45 of cooling plates. Then, the cells 10 of the middle layer would be contacted exclusively by insulation sides 24. Even through these, however, there may be some heat flow provided, which is reduced compared to the cooling sides 23. This can compensate for the fact that, unlike the other cells 10, the cells 10 of the middle layer are contacted by cooling plates 20, 25 both above and below.

Figure 5:
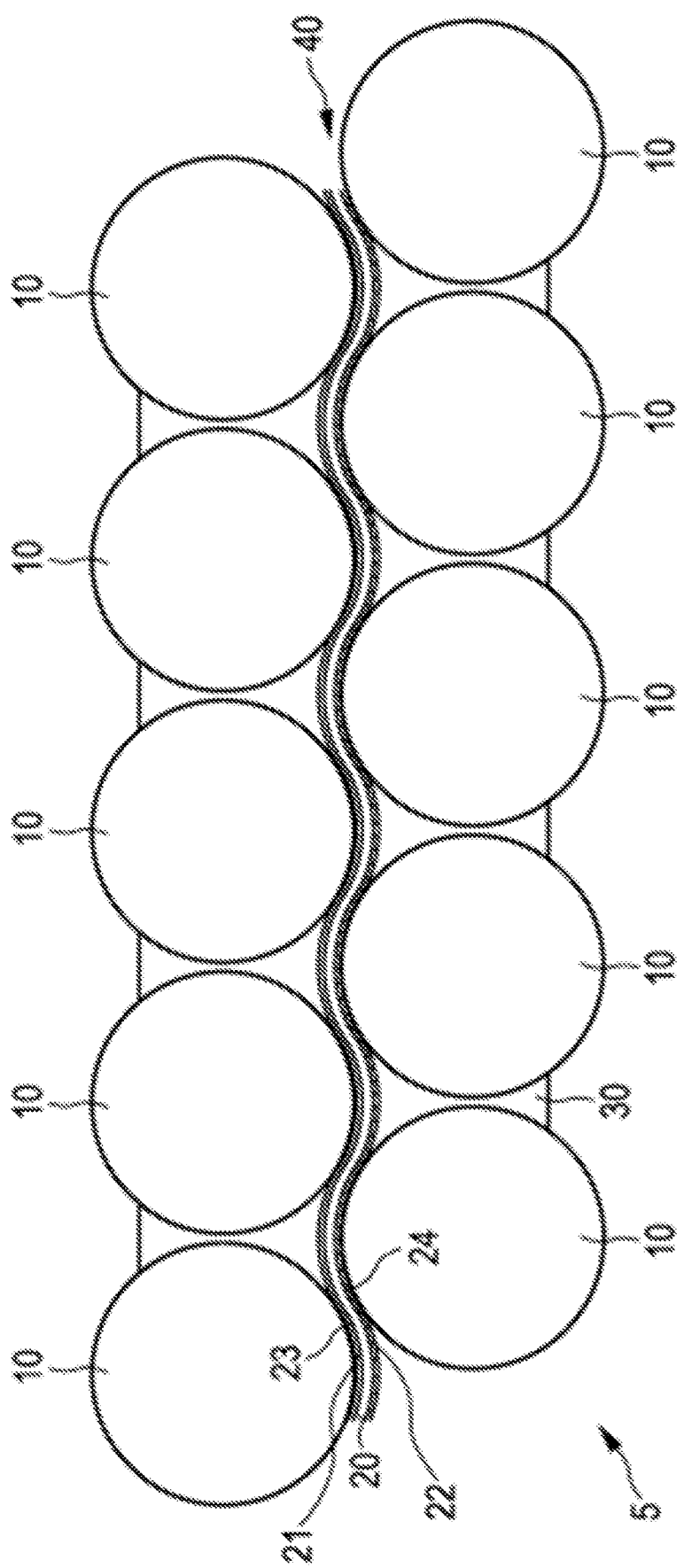
FIG. 5: shows an energy storage device according to a second exemplary embodiment.

FIG. 5 shows an energy storage device 5 according to a second exemplary embodiment. In contrast to the first exemplary embodiment of FIG. 4, there are only two layers of cells 10 provided, between which only one cooling plate 20 is present in the sectional view shown. This cooling plate is part of a single layer 40 of cooling plates, wherein cooling plates 20 of the first type and cooling plates 25 of the second type are again arranged in this layer 40. With such an energy storage device 5, a flatter design is achieved, since one layer of cells 10 is omitted. Otherwise, reference is made to the description of FIG. 4.

Designs with different numbers of layers of cells 10 can also be combined. For example, at least one part of an energy storage device 5 can be designed in accordance with FIG. 4 and at least one other part in accordance with FIG. 5. This allows the energy storage device 5 to adapt to different heights of an installation space, for example under a passenger compartment of a motor vehicle. Other numbers of layers of cells 10 are also possible.

For reasons of readability, the expression "at least one" has sometimes been omitted. Where a feature of the technology disclosed herein is described in the singular or with the indefinite article (for example the/a cell, the/a cooling plate, etc.), the plural thereof is also intended to be disclosed simultaneously (for example the at least one cell, the at least one cooling plate, etc.).

The above description of the present invention is for illustrative purposes only and is not intended to limit the invention. Various changes and modifications are possible within the scope of the invention without departing from the scope of the invention or its equivalents.

LIST OF REFERENCE SIGNS 5 energy storage device
10 cell
20 cooling plate
21 thermally conductive layer
22 thermally insulating layer
23 cooling side
24 insulation side
25 cooling plate
30 thermally insulating material
40 position of cooling plates
45 further layer of cooling plates
50 connection element
51 connection element
55 cooling plate assembly

The invention claimed is:

1. An energy storage device comprising:
a plurality of cells configured to store electrical energy; and
a plurality of cooling plates arranged between the plurality of cells,
wherein one or more cooling plates of the plurality of cooling plates each have a cooling side and an insulation side and contact one or more of the plurality of cells with the cooling side and/or the insulation side,
wherein the cooling sides have a higher thermal conductivity than the insulation sides,
wherein the plurality of cells are arranged in one layer or a plurality of layers, and wherein spaces between the plurality of cells arranged in a single layer are filled with thermally insulating material such that thermal insulation is formed between adjacent cells of the plurality of cells in the single layer.

2. The energy storage device according to claim 1, wherein each cooling plate of the plurality of cooling plates has a cooling side and an insulation side opposite the cooling side.

3. The energy storage device according to claim 1, wherein the cooling sides have a thermal conductivity that is at least five times a thermal conductivity of the insulation sides.

4. The energy storage device according to claim 1, wherein the cooling plates are arranged in one layer or a plurality of layers, and wherein each layer comprises more than one cooling plate of the plurality of cooling plates.

5. The energy storage device according to claim 4, wherein at least one layer comprises cooling plates having their insulation side pointing in a first common direction, and comprises cooling plates having their insulation side pointing in a second common direction, which is opposite the first common direction.

6. The energy storage device according to claim 5, wherein the at least one layer comprises the cooling plates having their insulation side pointing in the first common direction and cooling plates having their insulation side pointing in the second common direction alternately arranged within the at least one layer.

7. The energy storage device according to claim 4, wherein cooling plates of two layers of the plurality of layers contact cells of a layer of cells arranged directly between the two layers in each case by an insulation side of the cooling plates of the two layers.

8. The energy storage device according to claim 1, wherein each cell is contacted by at least one cooling side.

9. The energy storage device according to claim 1, wherein a cooling side and an insulation side of at least one cooling plate are formed between two cells that are adjacent, directly opposite each other, to the at least one cooling plate.

10. The energy storage device according to claim 1, wherein the plurality of cells are cylindrical, and/or wherein longitudinal axes of the plurality of cells are oriented parallel to each other.

11. The energy storage device according to claim 1, wherein spaces between the plurality of cells arranged in the single layer are filled with fire-retardant material.

12. The energy storage device according to claim 1, wherein the plurality of cooling plates are configured to be undulating and/or complementary to the plurality of cells at contact regions to the cells.

13. The energy storage device according to claim 1, wherein the insulation sides are thermally insulated by means of a thermally insulating layer.

14. The energy storage device according to claim 13, wherein the thermally insulating layer is formed of a mineral material, zeolite, glass fiber and/or silicone, and/or wherein the thermally insulating layer has a thickness of at most 1 mm.

15. A motor vehicle having an energy storage device according to claim 1.

* * * * *